United States Patent
Hooli et al.

(10) Patent No.: US 9,503,874 B2
(45) Date of Patent: Nov. 22, 2016

(54) COMMUNICATION OF CRITICAL DATA

(71) Applicant: Nokia Solutions and Networks Oy, Espoo (FI)

(72) Inventors: Kari Juhani Hooli, Oulu (FI); Kari Pekka Pajukoski, Oulu (FI); Esa Tapani Tiirola, Kempele (FI); Pasi Eino Tapio Kinnunen, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/443,501

(22) PCT Filed: Jan. 2, 2013

(86) PCT No.: PCT/EP2013/050007
§ 371 (c)(1),
(2) Date: May 18, 2015

(87) PCT Pub. No.: WO2014/106537
PCT Pub. Date: Jul. 10, 2014

(65) Prior Publication Data
US 2015/0296357 A1    Oct. 15, 2015

(51) Int. Cl.
*H04W 4/22*       (2009.01)
*H04W 28/26*   (2009.01)
(Continued)

(52) U.S. Cl.
CPC ............ *H04W 4/22* (2013.01); *H04W 28/26* (2013.01); *H04W 72/0426* (2013.01); *H04W 72/082* (2013.01)

(58) Field of Classification Search
CPC ......... H04W 72/042; H04W 72/0446; H04W 72/0453; H04W 72/0413; H04W 72/0406; H04W 72/085; H04W 74/0833; H04W 4/021; H04W 4/027; H04W 28/0236; H04W 28/26; H04W 4/22; H04W 72/0426; H04W 72/082; H04W 76/02; H04W 88/12; H04L 47/15; H04L 47/24
USPC ............ 455/404.1, 404.2, 414.2, 521, 456.1, 455/456.2, 456.4, 456.5, 456.6, 503, 414.1, 455/416, 426.1, 450, 452.1; 370/329, 328, 370/331, 252, 280, 311, 336
See application file for complete search history.

(56) References Cited

U.S. PATENT DOCUMENTS

| 7,308,271 | B2 * | 12/2007 | Hori ...................... H04W 76/02 455/414.1 |
| 2004/0078227 | A1 * | 4/2004 | Morris .................. G06F 19/322 705/2 |

(Continued)

FOREIGN PATENT DOCUMENTS

WO    WO 2009/007722 A1    1/2009

OTHER PUBLICATIONS

3GPP TS36.423 V11.3.0 (Dec. 2012), "3$^{rd}$ Generation Partnership Project; Technical Specification Group Radio Access Network; Evolved Universal Terrestrial Radio Access Network (E-UTRAN); X2 application protocol (X2AP) (Release II)", 141 pgs.

(Continued)

*Primary Examiner* — Inder Mehra
(74) *Attorney, Agent, or Firm* — Harrington & Smith

(57) ABSTRACT

Methods and apparatuses for supporting communication of critical data in a cellular system are disclosed. Upon determination of communication of critical data in a first cell a node of the first cell generates a signal including information of reservation of radio resources for said communication of critical data. The signal is communicated from the first cell to at least one second cell to reduce interference on said radio resources. A node of a second cell receives the signal and manages interference on said radio resources based on the signal. This includes prevention or limitation of use of said radio resources in the second cell when the second cell is not involved in communication of critical data.

25 Claims, 3 Drawing Sheets

(51) Int. Cl.
*H04W 72/04* (2009.01)
*H04W 72/08* (2009.01)

(56) References Cited

U.S. PATENT DOCUMENTS

| | | | |
|---|---|---|---|
| 2009/0201867 A1 | 8/2009 | Teo et al. | 370/329 |
| 2009/0268684 A1 | 10/2009 | Lott et al. | 370/329 |
| 2010/0061317 A1* | 3/2010 | Gorokhov | H04W 52/243 370/329 |
| 2010/0260086 A1* | 10/2010 | Santhanam | H04W 52/12 370/311 |
| 2010/0291957 A1* | 11/2010 | Ozaki | H04W 72/0426 455/509 |
| 2012/0163185 A1* | 6/2012 | Zhang | H04W 72/085 370/241 |
| 2015/0206408 A1* | 7/2015 | LaLonde | A61N 1/37282 340/539.12 |

OTHER PUBLICATIONS

Holma, Harri, et al., "8.6.2 Uplink Interference Coordination" LTE for UMTS-OFDMA and SC-FDMA Based Radio Access, © 2009 John Wiley & Sons. Ltd., pp. 206-207.

\* cited by examiner

COMMUNICATION OF CRITICAL DATA

TECHNICAL FIELD

This disclosure relates to communication of critical data in a cellular communication system.

BACKGROUND

A communication system can be seen as a facility that enables communications between two or more nodes such as fixed or mobile communication devices, access points such as base stations, servers and so on. A communication system and compatible communicating entities typically operate in accordance with a given standard or specification which sets out what the various entities associated with the system are permitted to do and how that should be achieved. For example, the standards, specifications and related protocols can define the manner how communication devices shall communicate with the access points, how various aspects of the communications shall be implemented and how the equipment shall be configured.

Signals can be carried on wired or wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A cell can be provided by a base station, there being various different types of base stations and cells.

A user can access the communication system by means of an appropriate communication device or terminal. A communication device is provided with an appropriate signal receiving and transmitting arrangement for enabling communications with other parties. Typically a communication device is used for enabling receiving and transmission of communications such as speech and data. The communication device may access a carrier provided by a base station, and transmit and/or receive communications on the carrier.

An example of cellular communication systems is an architecture that is being standardized by the 3rd Generation Partnership Project (3GPP). A recent development in this field is often referred to as the long-term evolution (LTE) of the Universal Mobile Telecommunications System (UMTS) radio-access technology. In LTE base stations are commonly referred to as enhanced NodeBs (eNodeB; eNB). An eNodeB can provide coverage for an entire cell or similar radio service area.

Importance and potential of cellular communication systems for public safety has been recognised. For example, the possibility of being able to communicate video data is considered as a critical aspect of various public-safety applications. Video data can be used, for example for surveillance applications, for improving situation awareness during critical missions and/or for improving co-operation between different groups and teams involved e.g. in response to a natural disaster or accident or other unexpected incident. Wireless video application support for different incidents has however been unavailable or limited due to limited capacity, in particular uplink (UL) capacity. This can be especially the case in locations where large cell area coverage is provided. Multiple high definition (HD) cameras can demand dense cell deployment, multiplying the number of cell sites required for achieving wide geographical coverage. Still, even with dense cell deployment, the video coverage cannot necessarily be guaranteed. For example, this may be limited by interference from other cells and/or depend on the load in interfering (e.g. neighbouring) cells.

Certain systems such as the LTE can deploy a frequency reuse scheme. This means that low signal-to-interference ratios (SIR) may occur when the same time-frequency resource is used in neighbouring cells. SIR as low as −5 dB or even lower may exist in a cell border. This can result spectrum efficiency as low as 0.1 bit/Hz. Considering 512 kbps as the minimum bit rate requirement for a video application, the required bandwidth for one good enough video application may be 5 MHz. Thus, if e.g. a major accident happens in a cell border area, the video capacity can be very poor.

Reliability of data transmission can be increased by selecting a sufficient low data rate in the combination with hybrid automatic repeat request (H-ARQ) mechanism. This is not especially efficient, and a cell may not be able to offer sufficient capacity for multiple video applications.

Radio resource release methods have also been considered in the context of flexible spectrum use between different radio access technologies or between different operators. In these scenarios, different systems can have primary and secondary access rights on the spectrum. The system, or cell, with secondary access rights can be required to release the requested radio resources. These solutions are not considered suitable for use in mission critical communications and public safety applications as it is not possible to assign appropriate access right classes to different cells beforehand, for example before an accident takes place. Also, multiple cells may simultaneously be needed to support mission critical communications. A mandatory resource release cannot be required from a cell supporting mission critical communications. In other words, the different access rights cannot be used to ensure sufficient capacity in an area of emergency as the precise location and/or cell where the need for communication of critical data arises cannot typically be predicted. After an incident, for example a major accident, the response should nevertheless be quick. This may require that the required capacity for video and other critical data should be available as soon as possible without a need for any specific configurations to be made after the incident. If possible, disruption to other communications should be kept minimal.

It is noted that the above discussed issues are not limited to any particular communication environment and station apparatus but may occur in any appropriate system enabling multiple uplink connections.

SUMMARY

Embodiments of the invention aim to address one or several of the above issues.

In accordance with an embodiment there is provided a method for supporting communication of critical data in a cellular system, comprising determining communication of critical data in a first cell, generating by a node of the first cell a signal including information of reservation of radio resources for said communication of critical data, and sending the signal from the first cell to at least one second cell to reduce interference on said radio resources.

In accordance with an embodiment there is provided a method for supporting communications of critical data by a first cell in a cellular system, comprising receiving in a node of a second cell a signal from the first cell to reduce interference, the signal including information of reservation of radio resources for communication of critical data in the first cell, and preventing or limiting use of said radio resources in the second cell based on the signal when the second cell is not involved in communication of critical data.

In accordance with an embodiment there is provided control apparatus for a radio cell, the apparatus comprising at least one processor, and at least one memory including computer program code, wherein the at least one memory and the computer program code are configured, with the at least one processor, determine communication of critical data in the first cell, generate a signal including information of reservation of radio resources for said communication of critical data, and cause sending of the signal from the first cell to at least one second cell to reduce interference on said radio resources.

In accordance with an embodiment there is provided a control apparatus for a second cell, the apparatus comprising at least one processor, and at least one memory including computer program code, wherein the at least one memory and the computer program code are configured, with the at least one processor, to receive a signal from a first cell to reduce interference, the signal including information of reservation of radio resources for communication of critical data in the first cell, and prevent or limit use of said radio resources in the second cell when the second cell is not involved in communication of critical data.

In accordance with a more specific embodiment the signal is used in the second cell for inter-cell interference coordination by the second cell when the second cell is involved in communication of critical data.

The information can be forwarded from the neighbouring cell to at least one another cell.

The size of an area where critical data is communicated may be limited by limiting the number of times the information is forwarded from a cell to another. The signal may include a counter for the number of times the information is forwarded.

The signal may include a command to forward the information to at least one another cell. A penultimate cell in the chain of forwarding may change the forwarded signal such that the command to forward is removed.

The signal may comprise one of an evacuation request and an evacuation zone extension request.

Information of reservation of radio resources may comprise information of physical radio resource blocks that are reserved or will be reserved on a physical shared channel for critical communications.

The signal may be sent from a cell in response to determining that a required bitrate cannot be provided in the cell for critical data.

Subsequent from sending the signal from a cell, it may be determined whether there is sufficient capacity in the cell for the communications of critical data, and in response thereto a second signal may be sent to at least one other cell either to cancel the command issued by the signal to reduce interference or to extend the area where interference is to be reduced.

Communications by the second cell may be allowed on limited resources and/or limited power/power spectral density when the second cell is not involved in communication of critical data. The limited resources can be defined by the cell that is involved in communication of critical data.

The signal to reduce interference may include information on reduction of transmission power.

Commands issued by the signal to reduce interference may be set to expire after a predefined period.

A cell that receives the signal may also be involved in communication of critical data, in which case the receiving cell may at least one of abstain from forwarding the information to any other cell and combine the received information with information of its own reservation of radio recourses for communication of critical data.

A computer program comprising program code means adapted to perform the herein described methods may also be provided. In accordance with further embodiments apparatus and/or computer program product that can be embodied on a computer readable medium for providing at least one of the above methods is provided.

A network node such as a base station can be configured to operate in accordance with the various embodiments. A communication system embodying the apparatus and principles of the invention may also be provided.

It should be appreciated that any feature of any aspect may be combined with any other feature of any other aspect.

BRIEF DESCRIPTION OF THE DRAWINGS

Embodiments will now be described in further detail, by way of example only, with reference to the following examples and accompanying drawings, in which.

DETAILED DESCRIPTION

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 and 2 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access system include those provided by base stations of systems that are based on technologies such as wireless local area network (WLAN) and/or WiMax (Worldwide Interoperability for Microwave Access).

Figure 1:
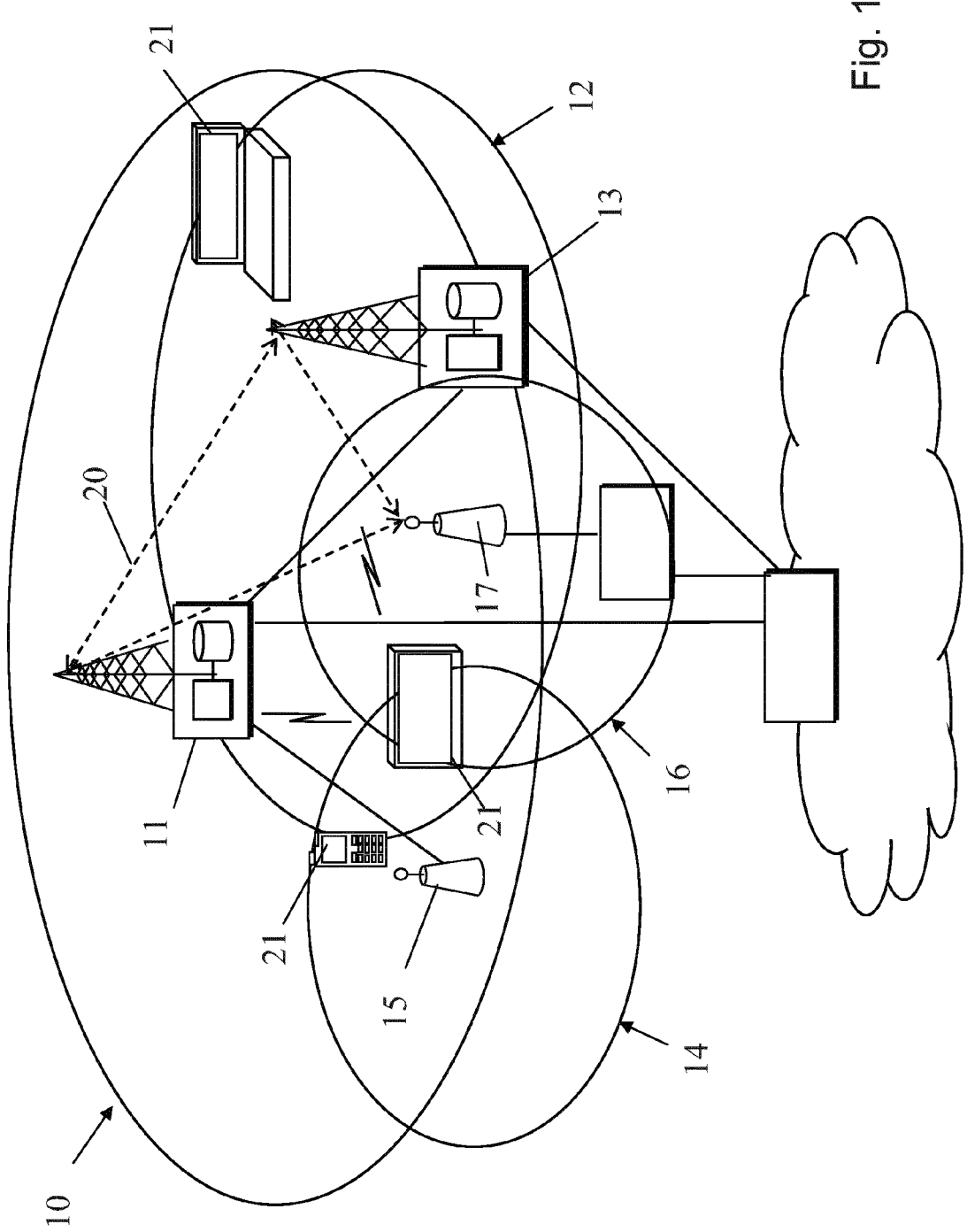
FIG. 1 shows a schematic diagram of a cellular system where certain embodiments can be implemented.

Communication devices or terminals 21 can be provided wireless access via base stations or similar wireless transmitter and/or receiver nodes providing radio service areas or cells. In FIG. 1 different neighbouring cells 10, 12, 14 and 16 are shown being provided by base stations 11, 13, 15 and 17, respectively. It is noted that the cell borders are shown only schematically for illustration purposes in FIG. 1. Thus it shall be appreciated that the number, size and shape of the cells may vary considerably from those shown in FIG. 1. A base station site can provide one or more cells or sectors. A sector may provide a cell or a subarea of a cell.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments the control apparatus may be respectively provided in each base station.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH; denoted by 15 in the example) that are connected to for example an eNB (denoted by 11 in the example).

Base station may communicate via each other via fixed line connection and/or air interface. The logical connection between the base station nodes can be provided for example by an X2 interface. In FIG. 1 this interface is shown by the dashed line denoted by 20.

The communication devices or terminals 21 may comprise any suitable device capable of wireless communication of data. For example, the terminals can be handheld data processing devices equipped with video cameras and appropriate user interface making them suitable for use by e.g. emergency response teams, rescue teams or the like mobile response unit.

Figure 2:
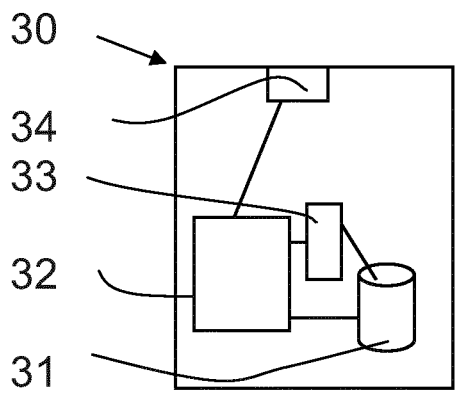
FIG. 2 shows a schematic diagram of a control apparatus according to some embodiments.

FIG. 2 shows an example of a control apparatus for a cell, for example to be integrated with, coupled to and/or otherwise for controlling any of base stations. The control apparatus 30 can be arranged to provide control on communications in the service area of a cell. The control apparatus 30 can be configured to provide control functions in association with critical data communications, such as in the case of emergency (e.g. major accidents, natural disasters, and so forth) and for reasons of public safety or state security in accordance with certain embodiments described below. For this purpose the control apparatus comprises at least one memory 31, at least one data processing unit 32, 33 and an input/output interface 34. Via the interface the control apparatus can be coupled to a receiver and a transmitter of the base station. The control apparatus can be configured to execute an appropriate software code to provide the control functions. It shall be appreciated that similar component can be provided in a control apparatus provided elsewhere in the system for controlling reception of sufficient information for decoding of received information blocks.

As shown in FIG. 1, cells can overlap and thus cells can interfere with each other. Interference control can be provided to manage interference caused by stations of other cells. For example, LTE includes an inter-cell interference control (ICIC) mechanism for controlling interference between cells. ICIC provides coordination between cells to avoid simultaneous transmission from communication devices at the cell border in neighbouring cells or other cells that could potentially cause severe interference to each other.

In LTE two different messages are used for uplink ICIC. High Interference Indication (HII) message can be used by an eNodeB to inform e.g. its neighbouring eNodeB(s) or other potentially interfering eNodeBs how the first mentioned eNodeB plans to schedule users in future so that the other eNodeB(s) can take this information into account. The HII message is frequency selective and contains a single bit per physical resource block (PRB) indicating whether the eNodeB intends to schedule cell-edge devices sensitive for interference as well as causing high inter-cell interference on those PRBs. Interference Overload Indicator (OI) message indicates interference experienced by a cell on its different PRBs. The basic concept is that an eNodeB measures interference and noise power and signals this information over the X2 interface to other cells. The OI message can indicate the interference at three levels: Low, Medium and High. An eNodeB receiving OI can then change its scheduling or power control behaviour to improve the interference situation for the eNodeB issuing the OI. Although information on interference is provided, there are currently no standardized handshake procedures between the eNodeBs and usage of ICIC is left open for vendors. Thus, the ICIC mechanism as such is not capable of guaranteeing sufficient data rates and/or coverage for mission critical data.

In addition to UL ICIC schemes, LTE supports proactive downlink ICIC scheme facilitated via standardized Relative Narrowband Transmit Power (RNTP) indicator. This is indicator is assigned per PRB and is signalled to neighbouring eNodeBs over the X2 interface. RNTP message can be used to indicate the maximum anticipated DL Tx power per PRB. The frequency of sending a new RNTP indicator is implementation specific. Also, the exact actions to be taken by an eNodeB receiving such message are left for the vendors to decide. Hence, similarly as UL ICIC, existing RNTP signalling arrangements as such may not be capable of guaranteeing sufficient DL coverage for mission critical data.

The below described embodiments provide coverage and capacity improvement for critical data, like video streaming, transmitted in networks such as LTE serving public-safety communications. In accordance with an aspect UL and/or DL coverage for a given data rate is enhanced during critical public safety incident communications. The coverage enhancement can be obtained by means of interference reduction in other cell(s). For example, an eNodeB that supports mission critical communications, signals information of radio resources that are, or will be, reserved for critical communication to other, potentially interfering cells. The signalling may take place on the X2 interface between the cells. In certain embodiments the above mentioned existing messages are utilised in providing the coverage and capacity improvement.

Figure 3:
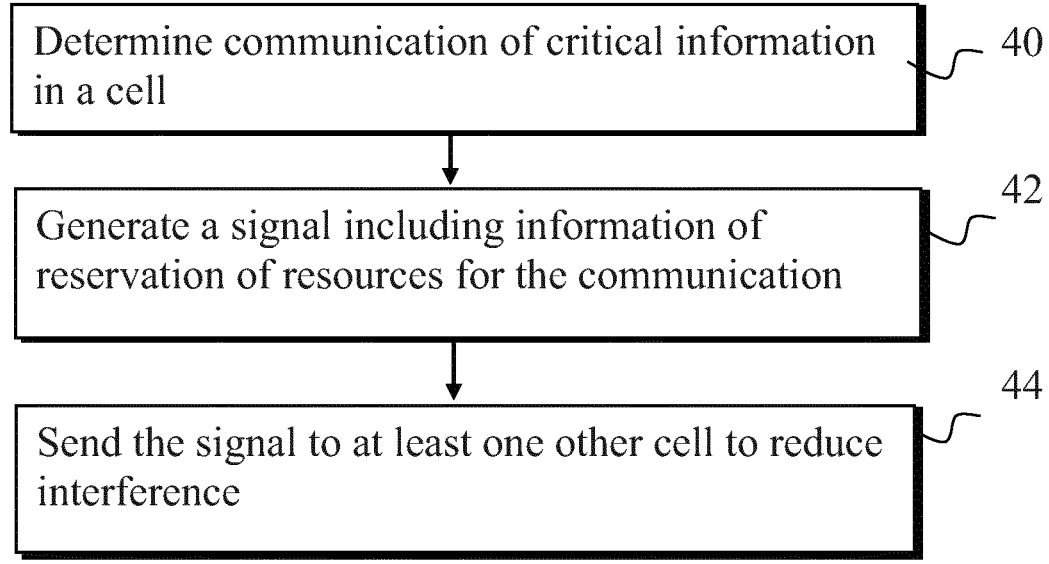
FIGS. 3 and 4 show flowcharts according to certain embodiments.
Figure 4:
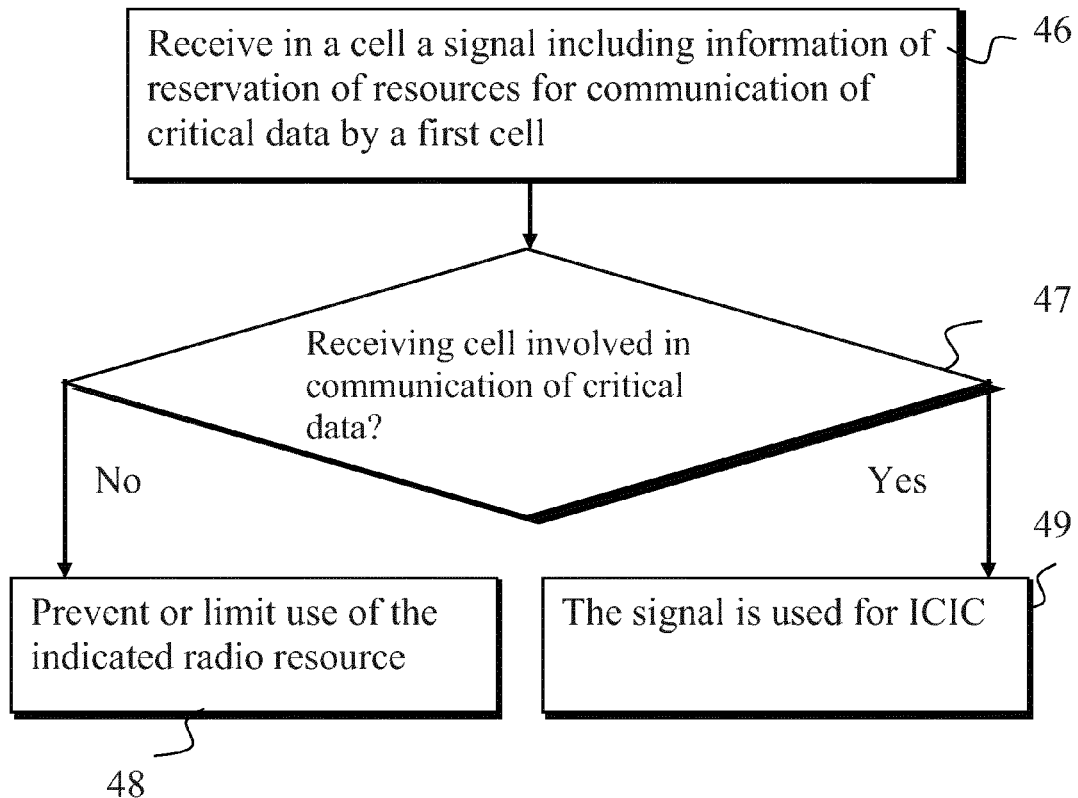

The flowcharts of FIGS. 3 and 4 illustrate general principles of operation in a first cell involved in communication of critical data and a second cell, respectively. In accordance with FIG. 3, in a method for supporting communication of critical data in a cellular system it is first determined at 40 if communication of critical data is needed in a first cell. A node, for example control apparatus associated with a base station of the first cell then generates at 42 a signal including information of reservation of radio resources for said communication of critical data. The signal is then sent at 44 to at least one other cell to reduce interference on said radio resources.

The cell or cells where the indication is sent can be decided in various manners. For example, the first indication can be initially sent to all neighbouring cells ($1^{st}$ tier). For example, a LTE cell has to be aware of individual neighbours (e.g. because of handovers). Neighbours can be defined automatically using e.g. an ANR (Automatic Neighbour relation) function if it has been implemented. Neighbours or other potentially interfering cells can also be defined by a network planner, or generated by a planning tool as part of network planning phase.

A cell can be "switched" to a mission critical state e.g. by a signal from the network. For example, a source cell may get information of e.g. an accident from the network. The eNB is able to analyze the interference conditions in the cell area and decide that decrease in interference from other cells would be beneficial.

FIG. 4 illustrates operation at a cell receiving the signal at 46 and how it then manages operation thereof to reduce interference at least on the cell sending the signal based on the signal. At 47 it can be determined that the receiving cell is not involved in communication of critical data. In that case the receiving cell can prevent use of said radio resources at 48.

Instead of preventing completely use of the resources, the receiving cell may limit use of the resources. Thus the cell can be allowed to communicate on limited resources and/or with limited power and/or power spectral density. The applied limit on power and/or power spectral density can be predefined e.g. as part of cell configuration. The limit may also be delivered by the signal. The receiving cell can be prevented from adjusting power/power spectral density limitation by itself.

In accordance with an embodiment, if it is determined at 47 that the receiving cell is also involved in communication of critical data, the signal is used at 49 for inter-cell interference coordination.

Instead of a "normal" ICIC, a new type ICIC may be used to implement the invention by applying it between cells where one cell has critical data communication and the other cell does not. A difference between these types is that in the new type ICIC, the ICIC signal is a "hard command" to reduce interference whereas the normal ICIC does not allow for such a command.

Figure 5:
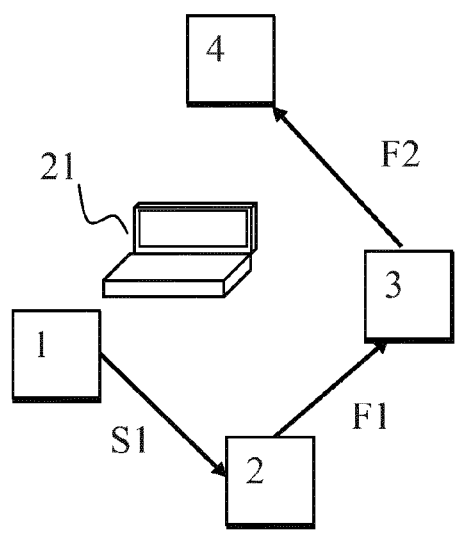
FIG. 5 shows an example of information forwarding.

In accordance with a further embodiment, the information can be forwarded by the receiving cell to at least one another cell. This is illustrated by FIG. 5 where a controller of a first cell 1 serving terminal 21 sends a signal S1 to a controller 2 of a second cell which then forwards the signal, or at least a part of the information thereof, by signal F1 to a controller of at least one further cell 3. The forwarding can be used to control the size of area where critical data is communicated. If even a larger area is determined necessary than that provided by nodes 1, 2 and 3, a second forwarding F2 and/or as many further forwarded signals as determined necessary, may follow. The size of the area can limited by limiting the number of times the information is forwarded from a cell to another cell.

Decision where to forward the indication can be made on various basis. A simple approach would be to send the indication to all neighbouring cells. Any signalling strategy used in current ICIC based solutions may also be applied.

In accordance with a mode specific embodiment the arrangement may be such that an eNodeB receiving the signalling is required to evacuate traffic from indicated physical resource blocks (PRBs) to improve the interference situation for the eNodeB issuing the signalling (source eNodeB) if the receiving eNodeB (target eNodeB) does not support mission critical communications. The signal may be used for inter-cell interference coordination if the receiving eNodeB is supporting mission critical communications so that mission critical data can be supported on both cells.

If interference suppression by means of interference coordination is determined as not sufficient to enable high enough data rates, the source eNodeB can signal instructions for evacuation zone extension to its neighbouring cells via X2. An eNodeB receiving such signalling may be required to forward the signal to its own neighbour cells via X2. The maximum size of evacuation zone can be limited by limiting the number of times the signal is forwarded. For example, signal S1 of FIG. 5 can include a command to forward the information to at least one another cell, and a penultimate cell in the chain of forwarding (i.e. node 3 in FIG. 5) changes the information such that the command to forward is removed from the signal. Other possibilities for limiting the number of times the information is forwarded will be described later.

According to a possibility the signalling may be based on already existing X2 signals. For example, the signals can be based on existing Overload Indicator (OI) and/or High Interference Indication (HII) signals for uplink Inter-Cell Interference Control (UL ICIC) that are modified to include an indication enabling use thereof for public safety networks in accordance with the herein described principles. According to a possibility OI signal fields are extended to contain information of radio resources reserved for critical data. In accordance with an embodiment signaling can be based on new meaning given to existing OI and/or HII values in public safety networks. For example, OI with "high interference" can indicate PRB evacuation and OI with "high interference" and corresponding HII bit set to "1" (high sensitivity) can indicate PRB evacuation extension. Alternatively, OI definition can be extended with PRB evacuation and PRB evacuation extension values.

In DL side, for example appropriately modified Relative Narrowband Transmit Power (RNTP) signals may be used with defined new meanings in public safety networks. Existing RNTP signals can thus be used with new meaning for the signalled "RNTP per PRB". For example, value "1" (high interference) may be used to indicate PRB evacuation. Furthermore, the range of existing RNTP threshold values may be extended to cover also higher values, for example higher than 3 dB. The extended RNTP threshold value could be used as additional or alternative evacuation trigger in packet switched (PS) use case.

An example of a possible procedure for a source eNodeB for an uplink scenario will now be described. It can be left up to an eNodeB to decide which bearers are critical. An eNodeB identifies that it cannot provide required bit rate for bearers marked/identified as critical. This decision may be based on some predetermined measurements, e.g. measured interference plus noise per PRB, measurements on Demodulation Reference Signal Sounding Reference Signal (DMRS/SRS), Channel-state information (CSI) reporting (DL side), true/realized performance indicator (e.g. bit-rate). Similar principles apply to any carriers or communication/stream(s)/transmission of critical data.

The source eNodeB issues PRB evacuation indication on suitable PRBs to its neighbouring eNodeBs. The arrangement can be such that the source eNodeB does not necessarily require PRB evacuation on all PRBs so that there remains reasonable capacity for basic communications in the neighbouring cells.

After the initial evacuation indication the source eNodeB can check if required bit rates can be provided. If this is not the case, it will issue PRB evacuation extension indication to its neighbouring eNodeBs. Thus the source node can issue a second signal, this signal instructing forwarding of the evacuation indication. By means of phased extension the impact to other cells can be as limited as possible. Two kinds of evacuation signals can thus be provided where an evacuation request does not instruct forwarding and an evacuation zone extension which instructs forwarding.

The source eNodeB may periodically check if it has excess UL capacity. If so, it can release PRB evacuation for example by signaling OI and/or HII update with "normal" content. This may be done by one neighbouring eNodeB at a time to have a gradual increasing in inter-cell interference.

A target eNodeB receiving the PRB evacuation indication that does not have active mission critical communications can be forced to evacuate the related PRBs from all physical uplink shared channel (PUSCH) traffic. Additionally, the PRB evacuation signal may indicate if reduction of transmission power levels is sufficient. This may be reasonable especially when PRB evacuation zone is extended beyond the first tier of neighbouring cells. For example, assuming hex cells and reuse factor of one, first ring of six cells of first tier and a second ring of twelve cells of second tier may be provided. This may be provided e.g. via extension of OI definition.

The eNodeB receiving PRB evacuation extension indication can issue PRB evacuation indication to its other neighbouring eNodeBs on corresponding PRBs. It can also keep the PRB evacuation content in the following OI and/or HII updates that it will issue later on. In other words, a target eNodeB can change a received PRB evacuation extension signal to a PRB evacuation signal. This can be used to limit the PRB evacuation extension to single forwarding and the evacuation zone is limited to two tiers of neighbouring cells.

According to a possibility, a PRB evacuation signal may incorporate a counter for the maximum or precise number the indication can be forwarded. The signal may also include information identifying the source eNodeB. Each time an eNodeB forwards the PRB evacuation signal, it reduces the counter by one. To provide this kind of operation, e.g. OI definition can be extended to carry the new parameters/values. Thus the signal includes a command to forward the information to at least one another cell, and when the counter reaches zero at a penultimate cell, the information is changed such that the command to forward is removed.

The target eNodeB can end PRB evacuation when it receives OI and/or HII update with "normal" content from the source eNodeB. If the target eNodeB has relayed the PRB evacuation indication it can issue OI and/or HII update with "normal" content to its neighbouring cells.

For reliability, PRB evacuation may also expire based on a predefined timer after last OI and/or HII update. The timer may be set for e relatively long period to ensure that the interference protection is not switched off during the emergency.

It is possible that the target eNodeB is also involved in mission critical communications when it receives the relevant signaling indicative resource block evacuation from the source eNodeB. In such case the eNodeB receiving e.g. PRB evacuation signal can use the signal as input value for inter-cell interference coordination (ICIC). The inter-cell interference coordination can be based e.g. on a method employing fraction frequency reuse between mission critical communication in different cells, or on a method where communicating devices in the cell center are scheduled on overlapping PRBs.

In this situation the eNodeB receiving PRB evacuation extension may be arranged to respond to the signal by not forwarding the PRB evacuation to its other neighbouring eNodeBs. This may be considered appropriate for example because the forwarding can potentially impact ICIC between the eNodeBs with mission critical communications. Another option is to incorporate the values received from the source eNodeB to a PRB evacuation signal the receiving eNodeB with mission critical communications is about to send but mark these values as forwarded values. The forwarded values can be disregarded in the ICIC between eNodeBs with mission critical communications.

One or more network nodes may act as sleeping nodes (e.g. RRHs). The sleeping nodes may be enabled if better connectivity is enabled/activated for a node associated with communication of critical data. The enablement may depend on time needed for the activation.

Embodiments may provide support for UL and/or DL video streaming with improved reliability/availability during mission critical communications in public safety networks. Efficient interference coordination between cells may be provided. If mission critical communications concentrates on a single cell within the cell area, resources can be quickly and flexibly released for that communication. If mission critical communications are spread to multiple cells, the proposed signaling can be used to facilitate use of known interference coordination methods between mission critical communications. Sufficient resources for basic communications may be maintained in cells without mission critical communication. Only relatively small changes may be need to the existing X2 signaling. It is possible that a public safety network may require in certain applications its own inter-cell signaling procedures containing e.g. acknowledgements. However, the herein described examples provide a light-touch alterative for such heavier changes.

It is noted that whilst embodiments have been described in relation to LTE, similar principles can be applied to any other communication system or indeed to further developments with LTE. Also, instead of carriers provided by base stations at least one of the carriers may be provided by a communication device such as a mobile user equipment. For example, this may be the case in application where no fixed equipment provided but a communication system is provided by means of a plurality of user equipment, for example in adhoc networks or other mobile stations that can act as a base or relay station. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method comprising:
    supporting communication of critical data in a cellular system, comprising
        determining communication of critical data in a first cell;
        generating by a node of the first cell a signal including information of reservation of radio resources for said communication of critical data, wherein information of reservation of radio resources comprises information of physical radio resource blocks that are reserved or will be reserved on a physical shared channel for critical communications; and
        sending the signal from the first cell to at least one second cell to reduce interference on said radio resources.

2. A method according to claim 1, wherein the signal comprises one of an evacuation request and an evacuation zone extension request.

3. A method according to claim 1, wherein the signal is sent from the first cell in response to determining that a required bitrate cannot be provided in the first cell for the critical data.

4. A method according to claim 1, comprising:
    subsequent from sending the signal from the first cell, determining whether there is sufficient capacity in the first cell for the communications of critical data; and
    in response thereto, sending a second signal to the at least one second cell either to cancel the command issued by the signal to reduce interference or to extend the area where interference is to be reduced.

5. A method according to claim 1, comprising allowing at least one of communications by the second cell on limited resources and limited power/power spectral density when the second cell is not involved in communication of critical data.

6. A method according to claim 1, wherein the signal to reduce interference includes information on reduction of transmission power.

7. A method according to claim 1, wherein commands issued by the signal to reduce interference expire after a predefined period.

8. A method according to claim 1 wherein at least one of the signal to reduce interference and a signal to cancel the interference reduction is transferred on an X2 interface based on an overload indicator message, high interface indication message or relative narrowband transmit power indicator message.

9. A method comprising:
    supporting communications of critical data by a first cell in a cellular system, comprising
        receiving in a node of a second cell a signal from the first cell to reduce interference, the signal including information of reservation of radio resources for communication of critical data in the first cell; and
        preventing or limiting use of said radio resources in the second cell based on the signal when the second cell is not involved in communication of critical data.

10. A method according to claim 9, wherein the signal is used for inter-cell interference coordination by the second cell when the second cell is involved in communication of critical data.

11. A method according to claim 9, comprising forwarding the information from the second cell to at least one another cell.

12. A method according to claim 11, wherein a size of an area where critical data is communicated is limited by limiting a number of times the information is forwarded from a cell to another.

13. A method according to claim 12, wherein the signal includes a counter for the number of times the information is forwarded.

14. A method according to claim 11, wherein the signal includes a command to forward the information to at least one another cell, and a penultimate cell in the chain of forwarding changes the forwarded signal such that the command to forward is removed.

15. A method according to claim 9, wherein, when the second cell receiving the signal to reduce interference is also involved in communication of critical data, the second cell at least one of
    abstains from forwarding the information to any other cell, and
    combines the received information with information of its own reservation of radio recourses for communication of critical data.

16. A control apparatus for a first cell, the apparatus comprising at least one processor, and at least one memory including computer program code, wherein the at least one memory and the computer program code are configured, with the at least one processor, to cause the apparatus to:
    determine communication of critical data in the first cell;
    generate a signal including information of reservation of radio resources for said communication of critical data, wherein information of reservation of radio resources comprises information of physical radio resource blocks that are reserved or will be reserved on a physical shared channel for critical communications; and cause sending of the signal from the first cell to at least one second cell to reduce interference on said radio resources.

17. A control apparatus according to claim 16, configured to determine whether a required bitrate can be provided in the first cell for the critical data, and in response thereto to send one of
   a request to at least one second cell to prevent or limit use of said radio resources;
   a request for extension of a zone where use of said radio resources shall be prevented or limited; and
   a command cancelling at least one of said requests.

18. A network node comprising the apparatus of claim 16.

19. A communication system comprising the apparatus of claim 16.

20. A control apparatus for a second cell, the apparatus comprising at least one processor, and at least one memory including computer program code, wherein the at least one memory and the computer program code are configured, with the at least one processor, to cause the apparatus to:
   receive a signal from a first cell to reduce interference, the signal including information of reservation of radio resources for communication of critical data in the first cell; and
   prevent or limit use of said radio resources in the second cell when the second cell is not involved in communication of critical data.

21. A control apparatus according to claim 20, wherein the apparatus is configured to use the signal for inter-cell interference coordination when the second cell is involved in communication of critical data.

22. A control apparatus according to claim 20, wherein the signal is configured to at least one of command forwarding of the information to at least one further cell and include a counter for a number of times the information is forwarded.

23. A control apparatus according to claim 22, configured to control a size of an area where critical data is communicated by limiting the number of times the information is forwarded from a cell to another.

24. A control apparatus according to claim 20, wherein the control apparatus is configured to, responsive to the second cell also being involved in communication of critical data, at least one of
   abstain from forwarding the information to any other cell; and
   combine the received information with information of its own reservation of radio recourses for communication of critical data.

25. A computer program comprising code means adapted to perform the method of claim 1 when the program is run on a processor.

* * * * *